US012441012B2

(12) United States Patent
Wong

(10) Patent No.: US 12,441,012 B2
(45) Date of Patent: Oct. 14, 2025

(54) PERSONAL CARE APPARATUS WITH AUTOMATIC IDENTIFICATION OF MULTIPLE HAIR TREATING ATTACHMENTS

(71) Applicant: RAYMOND INDUSTRIAL LTD., Hong Kong (CN)

(72) Inventor: John Ying Man Wong, Hong Kong (CN)

(73) Assignee: Raymond Industrial Ltd., Hong Kong (CN)

( * ) Notice: Subject to any disclaimer, the term of this patent is extended or adjusted under 35 U.S.C. 154(b) by 197 days.

(21) Appl. No.: 18/369,361

(22) Filed: Sep. 18, 2023

(65) Prior Publication Data

US 2025/0091234 A1 Mar. 20, 2025

(51) Int. Cl.
*B26B 19/38* (2006.01)

(52) U.S. Cl.
CPC ........ *B26B 19/386* (2013.01); *B26B 19/3866* (2013.01); *B26B 19/388* (2013.01)

(58) Field of Classification Search
CPC .. B26B 19/3853; B26B 19/386; B26B 19/388
See application file for complete search history.

(56) References Cited

U.S. PATENT DOCUMENTS 11,548,176 B2 * 1/2023 Krauss ................ B26B 19/3813
2010/0186234 A1 * 7/2010 Binder ................. H04N 13/194 348/E5.022
2011/0214289 A1 * 9/2011 Maichel .................. B26B 19/38 30/29.5
2011/0308087 A1 * 12/2011 Rehbein .................. B26B 21/40 30/526
(Continued)

FOREIGN PATENT DOCUMENTS

CN 207443565 U 6/2018
CN 112273830 A * 1/2021 ............... A45D 1/04
(Continued)

OTHER PUBLICATIONS

International Search Report & Written Opinion related to Application No. PCT/IB2024/000462; reported on Dec. 27, 2024.

*Primary Examiner* — Adam J Eiseman
*Assistant Examiner* — Richard D Crosby, Jr.
(74) *Attorney, Agent, or Firm* — von Briesen & Roper, s.c.

(57) ABSTRACT

A hair cutter includes a cutter head assembly and a main body. The cutter head assembly has a cutting type and is configured to be removably coupled to the main body. The cutter head assembly includes an identification part associated with the cutting type of the cutter head assembly. The main body includes a detection assembly, a drive assembly and a control board. The detection assembly is configured to transmit a signal indicative of the cutting type based on the identification part. The drive assembly is disposed inside the main body and includes an output shaft configured to be detachable from the cutter head assembly. The control board is disposed inside the main body and is in communication with the drive assembly and the detection assembly. The control board is configured to drive the cutter head assembly based on the cutting type of the cutter head assembly.

9 Claims, 6 Drawing Sheets

(56) References Cited

U.S. PATENT DOCUMENTS

| | | | | |
|---|---|---|---|---|
| 2012/0233866 | A1* | 9/2012 | Kammer | B26B 19/3886 132/271 |
| 2013/0192068 | A1* | 8/2013 | Kammer | B65D 75/36 206/356 |
| 2014/0137883 | A1* | 5/2014 | Rothschild | B26B 19/388 132/200 |
| 2015/0183118 | A1* | 7/2015 | Roth | B26B 19/3846 132/200 |
| 2015/0197016 | A1* | 7/2015 | Krenik | B26B 21/4081 83/13 |
| 2016/0167241 | A1* | 6/2016 | Goldfarb | B26B 21/4056 30/41.7 |
| 2018/0126571 | A1* | 5/2018 | Rothschild | A61C 17/221 |
| 2022/0001556 | A1* | 1/2022 | Good | B26B 21/4081 |

FOREIGN PATENT DOCUMENTS

| | | | |
|---|---|---|---|
| CN | 216992020 | U | 7/2022 |
| CN | 117381864 | A | 1/2024 |
| CN | 220903400 | U | 5/2024 |

* cited by examiner

PERSONAL CARE APPARATUS WITH AUTOMATIC IDENTIFICATION OF MULTIPLE HAIR TREATING ATTACHMENTS

TECHNICAL FIELD

The present disclosure relates to the technical field of hair cutters, in particular to a hair cutter with an identifying structure for a cutter head assembly.

BACKGROUND

A hair cutter is a tool for trimming hair. For example, body hair such as head hair, nose hair, longer beard or longer armpit hair can be trimmed by a hair cutter, and shorter stubble can also be trimmed by a hair cutter. However, most of the hair cutters currently on the market have one main body fixedly connected with one type of cutter head assembly. When users have different needs, they need to purchase multiple hair cutters, which is not only inconvenient to carry, but also results in higher costs to users.

In order to solve the above technical problems and meet the market demand, the industry has developed a connection structure which is mounted on the main body of the hair cutter and is adapted to receive various cutter head assemblies with different functions. Such interchangeable cutter head assemblies that are detachable from the connection structure between the cutter head assemblies and the same main body reduces the user's consumption costs and are also easy to carry when going out. However, since cutter head assemblies designed to cut head hair, nose hair, longer beard or longer armpit hair function differently and each require different running speeds, the same main body cannot make adaptive adjustments according to the required running speeds of the different functioning cutter head assemblies, thus users tend to have a poor user experience.

SUMMARY OF THE DISCLOSURE

The present invention aims to solve the technical problem in the prior art that when a main body is adapted for multiple cutter head assemblies with different functions, it cannot make adaptive adjustments according to the required running speeds of the cutter head assemblies with different functions. Disclosed herein is a hair cutter with a cutter head assembly identification structure, so that when the same main body is adapted to multiple cutter head assemblies with different functions, it can identify the type of cutter head assembly and control the output speed of its internal drive assembly to further control the operating speed of the cutter head assembly.

In order to solve the above technical problems, the present invention provides the following technical solutions: a hair cutter according to the present invention comprises a main body and a cutter head assembly detachably connected with the main body. The cutter head assembly includes an identification part associated with and indicative of the cutting type of cutter head assembly that is disposed on the main body. The main body includes: a detection assembly configured to identify the cutting type of the cutter head assembly based on the identification part of the cutter head assembly; a drive assembly and a control board. The drive assembly and the control board, which is configured to control the drive assembly to drive the cutter head assembly to run based on the cutting type of the cutter head assembly, are arranged in an outer shell and/or an inner shell of the main body of the hair cutter. The drive assembly includes an output shaft that is detachable from connection with the cutter head assembly. The control board is electrically connected to the drive assembly and the detection assembly respectively. In an embodiment, the detection assembly may include a detection component printed circuit board (PCB).

The cutter head assembly identification part of the present disclosure can allow one main body to be used with multiple cutter head assemblies with different functions, so that one main body is suitable for trimming hair, nose hair, longer beards or longer armpit hair, body hair or the like and is also suitable for shorter stubble; since there is an identification part on the cutter head assembly to determine the unique identity, after the cutter head assembly is connected to the main body of the hair cutter, the detected hair will be detected through the detection assembly of the main body. The signal (received by the photoelectric receiver) from the identification part is fed back to the control board. The control board is configured to identify the corresponding cutter head assembly based on the signal, and then controls the output speed of the drive assembly to achieve the optimal operating speed of the cutter head assembly and enhance the user's experience.

Further, in an embodiment, the identification part may be or may include a light-transmitting plate connected to the side or bottom of the cutter head assembly facing the main body. The identification parts (e.g., light-transmitting plates) on different cutter head assemblies have different light transmittances; the detection assembly of the main body includes an identification channel configured to receive the light-transmitting plate. In an embodiment, there may be only one channel opening to the identification channel. The identification channel is made of a high transmittance material. An infrared transmitter is provided on/adjacent to one sidewall of the identification channel, and a photoelectric receiver is provided on/adjacent to the other sidewall. When the cutter head assembly is connected to the main body of the hair cutter, the light-transmitting plate on the cutter head assembly penetrates the main body when inserted into the identification channel through the channel opening; the infrared transmitter emits infrared light that passes through the sidewall and light-transmitting plate of the identification part and is received by the photoelectric receiver. Via the detection component PCB, a signal that is based on the photoelectric signal received by the photoelectric receiver is fed to the control board. The control board identifies the type of cutter head assembly according to the photoelectric signal, and controls the output speed of the drive assembly.

Further, in an embodiment, the distance between the infrared transmitter and the photoelectric receiver is 2 millimeters (mm)~8 mm.

Furthermore, in an embodiment, the light transmittance of the material of the identification channel is above 85%.

Further, the main body includes an outer shell and a waterproof inner shell arranged inside the outer shell. The waterproof inner shell is sealed with a waterproof sealing cover at a port of the waterproof inner shell. The waterproof inner shell and the waterproof sealing cover cooperate to form a sealed cavity. The identification channel is disposed on the waterproof sealing cover, the channel body extends into the sealing cavity, and its channel opening is located on and accessed through the panel of the waterproof sealing cover; the light-transmitting plate of the cutter head assembly penetrates the outer shell of the main body and is inserted into the waterproof sealing cavity via the identification channel. The identification part is inserted into the channel opening on the sealing cover.

Further, a driving mechanism mounting seat is provided in the sealed cavity, and the detection component PCB of the detection assembly is arranged on the driving mechanism mounting seat, and the infrared emitter and the photoelectric receiver are respectively electrically connected to the detection component PCB through pins, so the detection component PCB is connected with the control board circuit.

Further, a receiving chamber is provided on the side of the drive assembly mounting seat facing the waterproof sealing cover, the detection component PCB is arranged at the notch of the receiving chamber, and the pins of the infrared transmitter and the photoelectric receiver pass through the detection component PCB then extend into the receiving chamber.

Further, in an embodiment, a partition is arranged inside the receiving chamber, which separates the pins of the infrared transmitter and the pins of the photoelectric receiver into two different spaces.

Further, in an embodiment, a positioning slot(s) facing the cutter head assembly is provided on the waterproof sealing cover, and a positioning pin(s) are provided on the cutter head assembly and are configured to be received into the positioning slot on the sealing cover.

Further, an annular protrusion/stopper is provided on the outer surface of the annular side wall of the waterproof sealing cover, and an annular groove is also arranged between the annular protrusion and the cover opening and on the surrounding outer surface of the annular side wall, and an annular sealing ring is arranged in the annular groove, the annular side wall of the waterproof sealing cover is inserted into the port of the waterproof inner shell, and the annular sealing ring in the annular groove is pressed against the side inner wall of the waterproof inner shell, and when the waterproof sealing cover is installed in place, the annular protrusion on it is generally parallel to and in contact with the plane of the port of the waterproof inner shell.

Further, a positioning post is provided on the waterproof sealing cover, and a positioning hole is provided inside the outer shell, and when the waterproof sealing cover is installed in place, the positioning post is inserted into the positioning hole; and/or when the waterproof sealing cover faces the sealing cavity. There is a threaded hole on one side, and a countersunk hole opposite to the threaded hole is provided on the driving mechanism mounting seat. The threaded fastener is screwed into the corresponding threaded hole after passing through the countersunk hole, and the driving mechanism mounting seat is connected to the waterproof sealing cover as one body.

Further, a spring mounting platform is also provided on the waterproof sealing cover, a spring piece mounted on the spring mounting platform, an assembly hole is arranged on the spring piece, and a fastener is provided on the cutter head assembly; when the cutter head assembly is installed on the main body, the fastener on the cutter head assembly snaps into the assembly hole on the spring piece.

Further, a cylindrical sleeve is arranged on the mounting seat of the driving mechanism, and the drive assembly is installed on the mounting seat of the driving mechanism, and the output shaft of the drive assembly runs through the cylindrical sleeve of the mounting seat of the driving mechanism, the waterproof sealing cover and the rear extension out to the outside of the sealed cavity; a double-slot transmission part is set on the free end of the output shaft of the drive assembly, and one of the grooves of the double-slot transmission part is set on the free end of the output shaft of the drive assembly, and the other a groove is sleeved on the linkage piece of the cutter head assembly.

Further, a stepped waterproof seal is arranged between the cylindrical sleeve and the waterproof sealing cover, and the waterproof seal is pressed against the cylindrical sleeve through the waterproof sealing cover, and the waterproof seal is wrapped on the side wall of the output shaft of the drive assembly.

In one aspect of the present disclosure, a hair cutter is disclosed. The hair cutter may comprise a cutter head assembly and a main body. The cutter head assembly has a cutting type, and is configured to be removably coupled to a main body. The cutter head assembly may include an identification part associated with the cutting type of the cutter head assembly. The main body may comprise a detection assembly, a drive assembly and a control board. The detection assembly may be configured to transmit a signal indicative of the cutting type of the cutter head assembly based on the identification part. The drive assembly may be disposed inside the main body and include an output shaft configured to be detachable from the cutter head assembly. The control board may be disposed inside the main body and is in communication with the drive assembly and the detection assembly. The control board is configured to determine the cutting type of the cutter head assembly based on the signal received from the detection assembly and to drive the cutter head assembly based on the cutting type of the cutter head assembly

BRIEF DESCRIPTION OF THE DRAWINGS

The above and other objects, features and advantages of the present invention will become more apparent by a more detailed description of the preferred embodiments of the present invention illustrated in the accompanying drawings. The same reference numerals refer to the same parts throughout the drawings, and the drawings are not intentionally drawn to scale to actual size, the emphasis being on illustrating the gist of the present invention.

Figure 1:
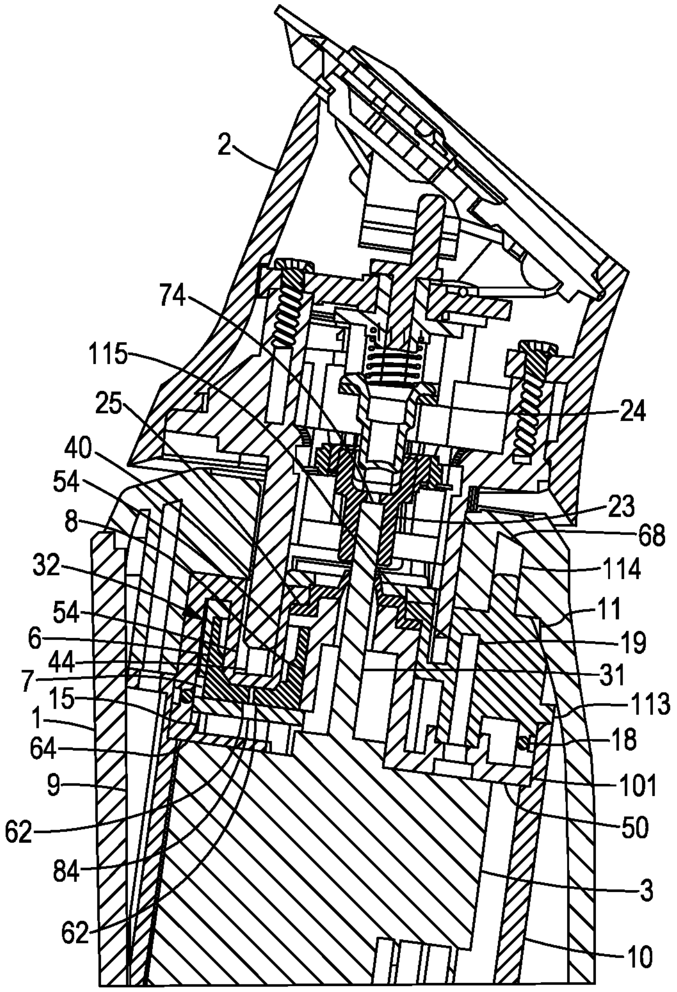
FIG. 1 is a partial sectional view of the hair cutter.

Among them, the main body 1; the cutter head assembly 2; the drive assembly 3; the output shaft 31; the identification part 4; the control board 5; the identification channel 6; the infrared transmitter 7; the photoelectric receiver 8; the outer shell 9; the waterproof inner shell 10; annular stepped surface 101; waterproof sealing cover 11; panel 111; surrounding annular side wall 112; annular protrusion 113; positioning post 114; threaded hole 115; spring mounting platform 116; battery 12; driving mechanism mounting seat 13; cylindrical sleeve 131; detection component PCB 14; receiving chamber 15; positioning slot 16; positioning pin 17; annular sealing ring 18; threaded fastener 19; metal spring piece 20; fastener 21; connection seat 22; double tank transmission part 23; linkage 24; waterproof seal 25.

DETAILED DESCRIPTION OF EMBODIMENTS

In order to facilitate understanding of the present invention, it will be described more fully below with reference to the relevant drawings. It should be noted that when an element is referred to as "connected" or "coupled" to another element, it can be directly connected to and integral with the other element, or intervening elements may also be present. The terms "installation," "one end," "other end," and similar expressions used herein are for illustrative purposes only.

Unless otherwise defined, all technical and scientific terms used herein have the same meaning as commonly understood by one of ordinary skill in the art. The terminology used in the specification herein is for the purpose of describing specific embodiments only and is not intended to limit the invention. As used herein, the term "and/or" includes any and all combinations of one or more of the associated listed items.

Figure 2:
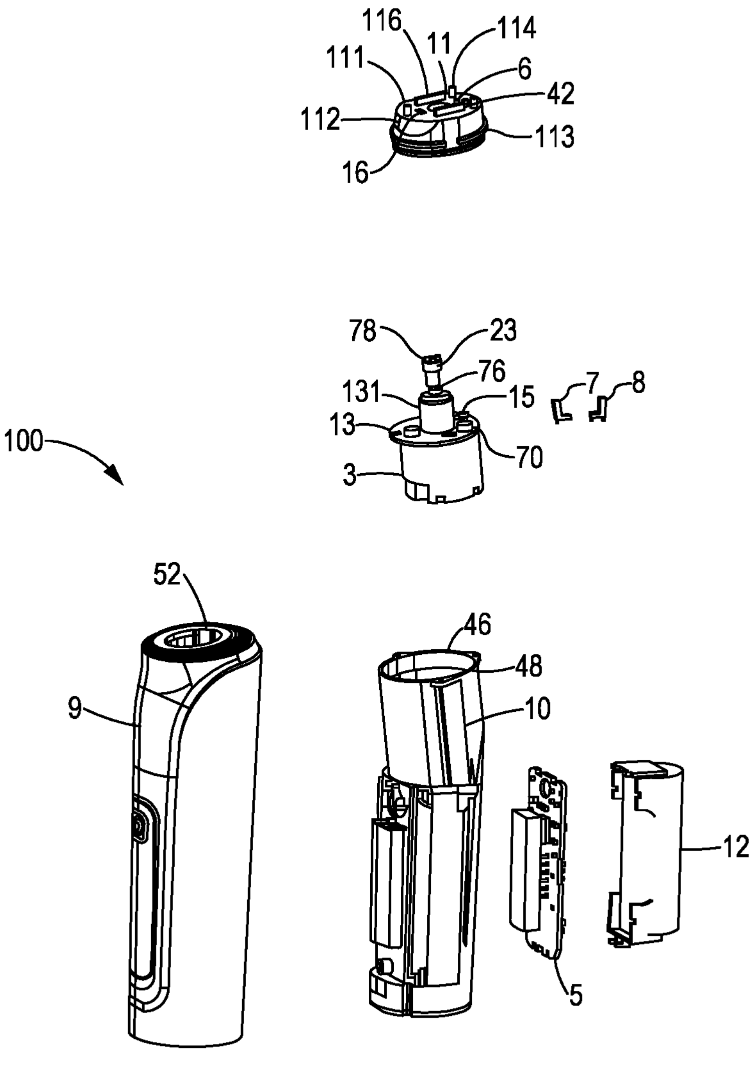
FIG. 2 is a schematic diagram of the exploded view of the present invention.
Figure 3:
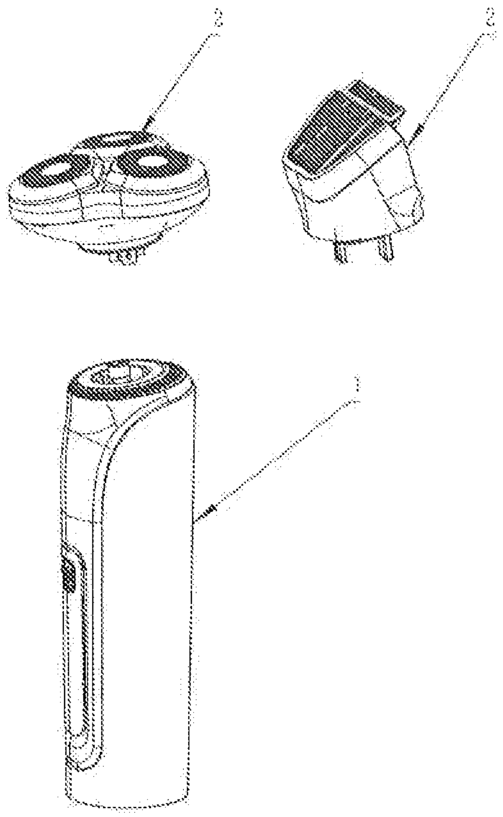
FIG. 3 is a schematic diagram of the exploded structure of the main body of the hair cutter and two exemplary the cutter head assemblies.

The present disclosure discloses an embodiment of a hair cutter 100. Refer to FIGS. 1 to 3. The hair cutter 100 includes a main body 1 and a cutter head assembly 2 that can be detachably coupled to the main body 1 via a universal connection structure. In order to achieve multiple uses with one hair cutter, one main body 1 is configured to be used in combination with each of a plurality of different types of cutter head assemblies 2, each having a different function (e.g., trimming hair, cutting nose hair, shaving, etc.). There is a universal connection structure, which is known in the art, disposed between the main body 1 and the cutter head assembly 2 and configured to couple a cutter head assembly 2 to the main body 1. Each of the plurality of cutter head assemblies 2 has a cutting type that is defined by the function to which the cutter head assembly 2 is directed. Exemplary cutting types may include, but are not limited to, a shaver, a hair trimmer, a nose hair trimmer, a beard trimmer, armpit hair shaver, etc. Each cutter head assembly has a cutter running speed associated with expected performance of that type of cutter head assembly 2.

In an exemplary embodiment, in order to facilitate the main body 1 to distinguish between cutter head assemblies 2 with different functions and control the output speed of the drive assembly 3 of the main body 1, the cutter head assembly includes an identification part 4 (best seen in FIG. 4) that is associated with the cutting type of the cutter head assembly 2 and that is indicative of the cutting type of the cutter head assembly 2 disposed on the main body 1. The main body 1 includes a detection component PCB 14 configured to transmit a signal indicative of the identification part 4 on the cutter head assembly 2. The main body 1 further includes a drive assembly 3 and a control board 5. The control board 5 is configured to determine the cutting type of the cutter head assembly 2 based on the signal received from the detection assembly 32 (e.g., the detection component PCB 14) and to control the drive assembly 3 to drive the cutter head assembly 2 (at the cutter running speed associated with the cutter head assembly 2 based on the identification of the cutting type of cutter head assembly 2.

The drive assembly 3 includes an output shaft 31. The output shaft 31 (see FIG. 1) of the drive assembly 3 is detachably connected to the cutter head assembly 2, and the control board 5 is electrically connected to the drive assembly 3 and the detection assembly 32 respectively. The structure of the detachable connection between the output shaft 31 of the drive assembly 3 and the cutter head assembly 2 is part of the universal connection structure, which is known in the art. Similarly, the circuit connection of the control board 5 with the drive assembly 3 and the circuit connection with the detection assembly 32 is also known in the art. In an embodiment, the drive assembly 3 may include or may be a motor or a motor that can be reversed, such as a brushless motor. In an embodiment, the drive assembly 3 may have an output speed of about 2000 rpm-about 6500 rpm.

In a preferred embodiment, referring to FIG. 1 to FIG. 4, the identification part 4 may include or may be a light-transmitting plate 82 connected to the side or bottom of the cutter head assembly 2 that faces the main body 1. The light-transmitting plates 82 on each different cutting type of cutter head assembly 2 is/are made of material uniquely associated with that cutting type of cutter head assembly 2 and has a different rate of light transmittance than the light transmitting plate(s) of the other cutting types of cutter head assemblies 2 that may be utilized with the same main body 1.

The detection assembly 32 includes an identification channel 6 (see FIGS. 1-2) that is disposed inside the outer shell 9 of the main body 1. In an embodiment, the identification channel 6 may be U-shaped with only one channel opening 40, and the material of the identification channel 6 may be optical rate and have high transparency. In an embodiment, the identification channel 6 may include a first sidewall 54 and an opposing second sidewall 54. An infrared transmitter 7 may be disposed adjacent to a first sidewall 54 of the identification channel 6, and a photoelectric receiver 8 may be disposed adjacent to the second sidewall 54. When the cutter head assembly 2 is connected to the main body 1, the light-transmitting plate 82 of the identification part 4 on the cutter head assembly 2 penetrates the main body 1 via insertion into the identification channel 6 through the channel opening 40 to the identification channel 6. In the exemplary embodiment, the channel opening 40 to the identification channel 6 is slot shaped. The infrared transmitter 7 is configured to emit (a first) infrared light. The (first) infrared light passes through the first sidewall 54 of the identification channel 6, through the light-transmitting plate 82 and through the second sidewall 54 of the identification channel 6 and the resulting light emanating from the second sidewall 54 (second infrared light) is received by the photoelectric receiver 8.

The detection component PCB 14 is in communication with the photoelectric receiver 8 and is configured to convert the photoelectric signal received by photoelectric receiver 8 to an analog signal and to transmit the analog signal (that is based on the received photoelectric signal (the second infrared light)) to the control board 5. The control board 5 is configured to identify the cutting type of the cutter head assembly 2 according to the received analog signal (that is based on the photoelectric signal), and is further configured to control (e.g., via a PWM signal) the drive assembly 3 output speed based on the cutting type of cutter head assembly 2. Since the material of the identification channel 6 is a material with high light transmittance, the infrared light emitted by the infrared transmitter 7 will not be blocked, and the detection result will not be affected. In an embodiment, the light transmittance of the material of the identification channel 6 must be more than 85%, for example, glass, polycarbonate (PC), plexiglass (PMMA), polyethylene terephthalate (PET), etc. Preferably plastic material may be used, which can reduce the overall weight of the hair cutter. Because the light transmittance of the light-transmitting plate 82 of the identification part 4 on each of the cutter head assemblies 2 is different, each cutter head assembly 2 has a unique cutting type/identity for the control board 5 to identify, and thus control the drive assembly 3 to output the corresponding optimal operating speed for that cutter head assembly 2 to improve the user experience.

The light transmittance of the light-transmitting plates 82 of different cutter head assemblies 2 has different ranges. When there are five cutter head assemblies 2 with different functions, the light transmittance range may be preset in the control board 5. For example, the light transmittance "range one" may be 0-less than 20%, which corresponds to the cutter head assembly 2 "component number one," and the light transmittance "range two" may be 20%-less than 40%, which corresponds to the cutter head component assembly 2 "component number two," and the light transmittance "range three" may be 40-less than 60%, which corresponds to the cutter head assembly 2 "component number three," and the light transmittance "range four" may be 60%-less than 80%, which corresponds to the cutter head assembly 2 "component number four," and the light transmittance "range five" may be 80%-99%, which corresponds to the cutter head assembly 2 "component number five." When a cutter head assembly 2 is disposed on the main body 1, the light-transmitting plate 82 on it is inserted into the identification channel 6. As described in more detail above, at this time, the infrared transmitter 7 emits infrared light, and part of the light passes through the light-transmitting plate 82. After passing through the light-transmitting plate 82, it is received by the photoelectric receiver 8. The detection component PCB board 14 is configured to convert the infrared light signal received by the photoelectric receiver 8 into an analog signal, and to send the analog signal to the control board 5. The control board 5 is configured to compare the signal with multiple preset light transmittance ranges to confirm/identify the cutting type (e.g., in the previous example, the component number) of the connected cutter head assembly 2. The control board 5 is configured to convert the received analog signal into a pulse width modulated (PWM) signal transmitted to the drive assembly 3 to output a speed that matches the running speed of the cutter head assembly 2 to provide the user with better user experience.

In an embodiment, the wavelength of the infrared light emitted by the infrared transmitter 7 is 700 nanometers (nm)~1500 nm. Since the material of the identification channel 6 is a material with high light transmittance (more than 85%), the identification channel 6 will not block the light emitted by the infrared transmitter 7. All the light is emitted to the light-transmitting plate 82, and because the light transmittance of the light-transmitting plates 82 on the cutter head assemblies 2 of different functions is different, it allows some wavelengths of infrared light according to the different light transmittances of the light-transmitting plate 82 to pass through to facilitate subsequent identification of the identity of the cutting type of cutter head assembly 2 based on light transmittance.

In a preferred embodiment, the infrared transmitter and the photoelectric receiver are about 2 mm~about 8 mm apart, such as 2 mm, 3 mm, 4 mm, 5 mm, 6 mm, 7 mm or 8 mm, etc. to ensure that the photoelectric receiver can accurately receive the infrared light emitted by the infrared transmitter.

In the preferred embodiment, referring to FIGS. 1 and 2, the main body 1 includes an outer shell 9 and a waterproof inner shell 10 arranged inside the outer shell 9. A waterproof sealing cover 11 is sealed at the port 46 of the waterproof inner shell 10, which is waterproof. The waterproof inner shell 10 cooperates with the waterproof sealing cover 11 to form a sealed cavity 50. The channel opening 40 to the identification channel 6 is provided on the waterproof sealing cover 11. In the exemplary embodiment, the identification channel 6 includes a channel body 44, which may be generally slot-like in shape, that extends into the sealed cavity 50, and its channel opening 40 is located on the panel 111 of the waterproof sealing cover 11. The light-transmitting plate 82 of the cutter head assembly 2 penetrates the outer shell 9 of the main body 1 by insertion into the identification channel 6 on the waterproof sealing cover 11. By arranging the waterproof inner shell 10 and the waterproof sealing cover 11 sealingly connected with the waterproof inner shell 10, it is avoided that external liquid enters the inside of the main body 1 and damages the drive assembly 3, control board 5, the infrared transmitter 7, the photoelectric receiver 8 and battery 12 and other electronic devices. The outer shell 9 is provided with a shell through hole 52 at one end facing the cutter head assembly 2 for detachable connection between the cutter head assembly 2 and the main body 1. By providing a shell through hole 52 on the outer shell 9, so that the panel 111 of the waterproof sealing cover 11 is partially exposed at the shell through hole 52, and the channel opening 40 of the identification channel 6 is exposed, so that the light-transmitting plate 82 can be inserted into the identification channel 6 via the open channel opening 40. The identification channel 6 and the waterproof sealing cover 11 may be formed into a whole body by one-piece molding, which can make the overall strength of the waterproof sealing cover 11 higher. Of course, they can also be connected in other ways. In an exemplary embodiment, the panel 111 of the waterproof sealing cover 11 is connected as discussed below. A cover through hole 42 is provided on the waterproof sealing cover 11 so that the channel opening 40 of the identification channel 6 is aligned with the cover through hole 42 on the panel 111 of the waterproof sealing cover 11, and the identification channel 6 is fastened/mounted to the waterproof sealing cover 11 through adhesive or other fasteners under the panel 111. Since the identification channel 6 has only one channel opening 40, and its bottom and side walls 54 are closed (without openings), its channel body 44 is not connected to the sealed cavity, which ensures that the light-transmitting plate 82 can be accommodated while also ensuring sealing good waterproof performance inside the sealed cavity 50. The waterproof sealing cover 11 includes a panel 111 and a surrounding wall 112 provided at the edge of the panel 111. When the waterproof sealing cover 11 is disposed over (covers) the port 46 of the waterproof inner shell 10, the surrounding wall 112 is inserted into the waterproof inner shell 10 and fits closely with the inner wall 48 of the waterproof inner shell 10. The panel 111 of the waterproof sealing cover 11 is provided with a perforation 56 opposite to the outer through hole 52 on the outer shell 9 to facilitate sealing. The output shaft 31 of the drive assembly 3 in the sealed cavity 50 can extend to the outside of the sealed cavity 50 via the perforation 56.

Figure 5:
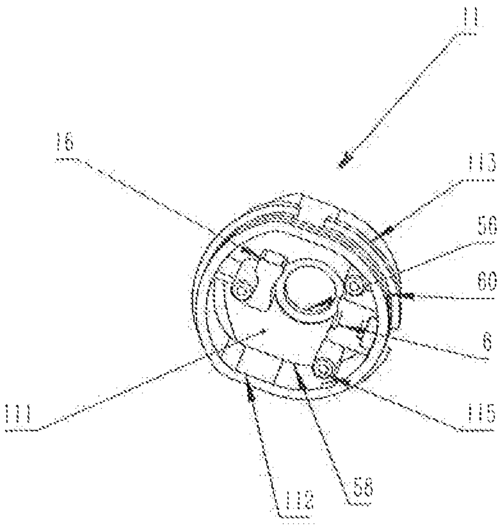
FIG. 5 is a perspective bottom view of the waterproof sealing cover.
Figure 6:
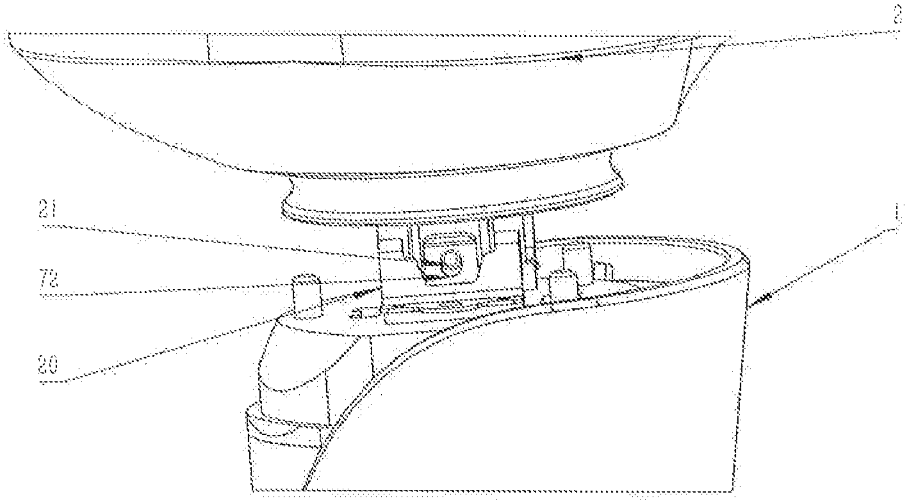
FIG. 6 is a schematic diagram of the installation structure of the metal spring piece and the fastener.

In the preferred embodiment, see FIG. 1, FIG. 2 and FIG. 5, the detection assembly 32 further includes the infrared transmitter 7, the photoelectric receiver 8, and a detection component PCB 14. A driving mechanism mounting seat 13 is disposed in the sealed cavity 50, the detection component PCB 14 is disposed on the driving mechanism mounting seat 13, the infrared transmitter 7 and the photoelectric receiver are 8 are electrically connected to the detection component PCB 14 through pins 62 respectively, and the detection component PCB 14 is electrically connected to the control board 5. The connection structure of the detection component PCB 14, the infrared transmitter 7 and the photoelectric receiver 8, and the electrical connection structure of the detection component PCB 14 and the control board 5 is known to those of skill in the art. The control board 5, detection assembly (including the infrared transmitter 7 and the photoelectric receiver 8) and the drive assembly 3 are also connected to the power module circuit, and the control board 5, the detection component PCB 14, the infrared transmitter 7, the photoelectric receiver 8 and the drive assembly 3 are connected with the power module. The circuit connection structure is an existing technology, and the power module can be a battery 12 or a power interface. An annular stepped surface 101 is provided on the inner wall of the port side of the waterproof inner shell 10, and the driving mechanism mounting seat 13 is placed on the annular stepped surface 101. When the waterproof sealing cover 11 is disposed on the port 46 of the inner shell 10, the end surface of the surrounding wall 112 abuts against the driving mechanism mounting seat 13 to press the driving mechanism mounting seat 13 against the annular stepped surface 101 of the waterproof inner shell 10.

In the preferred embodiment, referring to FIGS. 1 and 2, a receiving chamber 15 is provided on the side of the driving mechanism mounting seat 13 facing the waterproof sealing cover 11, and the detection component PCB 14 is provided at the notch of the receiving chamber 15, and the pins 62 of the transmitter 7 and the photoelectric receiver 8 penetrate the detection component PCB 14 and then extend into the receiving chamber 15. The receiving chamber 15 is provided to provide a certain installation height of the detection component PCB 14, thereby providing installation space for the pins 62.

In the preferred embodiment, see FIG. 2, a partition 84 is provided inside the receiving chamber 15 to separate the pins 62 of the infrared transmitter 7 and the pins 62 of the photoelectric receiver 8 in two different spaces. This is to avoid electrical interference between the pins 62 of the infrared transmitter 7 and the pins 62 of the photoelectric receiver 8.

Figure 4:
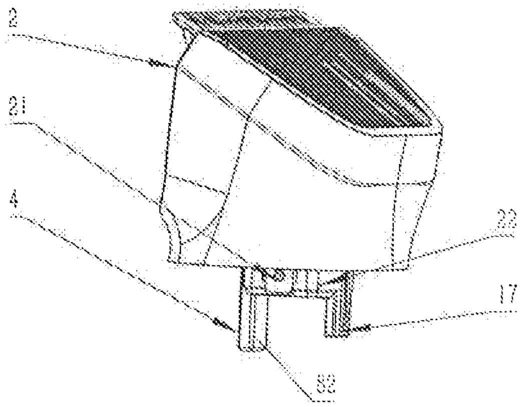
FIG. 4 is a schematic structural diagram of an exemplary cutter head assembly with one of the functions.

In the preferred embodiment, referring to FIGS. 2 and 4, the waterproof sealing cover 11 is provided with a positioning slot 16 facing the cutter head assembly 2, the cutter head assembly 2 is provided with a positioning pin 17 configured to guide the cutter head assembly 2 connection to the main body 1. After the main body 1 is connected into one body, the positioning pin 17 penetrates the outer shell 9 and then are inserted into the positioning slot 16 on the waterproof sealing cover 11. Through the cooperation of the positioning pin 17 and the positioning slot 16, the cutter head assembly 2 and the main body 1 are quickly connected.

In the preferred embodiment, referring to FIGS. 1 and 2, an annular protrusion 113 is provided on the outer surface of the annular side wall 112 of the waterproof sealing cover 11, and an annular groove 60 is disposed between the annular protrusion 113 and the cover opening 58 (FIG. 5) and on the outer surface of the surrounding annular side wall 112. The annular groove 60 is provided with an annular sealing ring 18 in the annular groove 60. The annular side wall 112 of the waterproof sealing cover 11 is inserted into the port 46 (FIG. 2) of the waterproof inner shell 10, and the annular sealing ring 18 (FIG. 5) in the annular groove 60 is pressed against the inner wall 48 of the waterproof inner shell 10, and when the waterproof sealing cover 11 is installed in place, the annular protrusion 113 on it is generally parallel to and in contact with the plane of the port 46 of the waterproof inner shell 10. Specifically, the annular protrusion 113 and the annular groove 60 are both provided on the surrounding annular side wall 112 of the waterproof sealing cover 11. When the annular sealing ring 18 is installed in the annular groove 60, only part of it is embedded in the annular groove 60, and part of it is located outside of the annular groove 60. In addition, when the waterproof sealing cover 11 is closed on the port 46 of the waterproof inner shell 10, the surrounding annular side wall 112 of the waterproof sealing cover 11 and the annular sealing ring 18 thereon are inserted into the inside of the waterproof inner shell 10. The surrounding annular side wall 112 and the inner wall 48 of the waterproof inner shell 10 work together to squeeze the annular sealing ring 18 and deform the annular sealing ring 18 to seal the assembly surface between the waterproof sealing cover 11 and the waterproof inner shell 10 to prevent external liquid from entering the seal in the sealed cavity 50. When the lower surface of the annular protrusion 113 touches the plane of the port 46 of the waterproof inner shell 10, the waterproof sealing cover 11 is prompted to be assembled in place.

In the preferred embodiment, referring to FIGS. 1 and 2, a positioning post 114 is provided on the waterproof sealing cover 11, and a positioning hole 68 is provided inside the outer shell 9. When the waterproof sealing cover 11 is installed in place, the positioning post 114 is inserted into the positioning hole 68; specifically, the positioning post 114 is provided on the panel 111 of the waterproof sealing cover 11, and the outer shell 9, the waterproof inner shell 10, and the waterproof sealing cover 11 are quickly assembled through the cooperation of the positioning post 114 and the positioning hole 68. A threaded hole 115 is provided on the side of the waterproof sealing cover 11 facing the sealed cavity 50. A countersunk hole 70 opposite to the threaded hole 115 is provided on the driving mechanism mounting seat 13. The threaded fastener 19 is passed through the countersunk hole 70 and then screwed into the corresponding threaded hole 115. The threaded hole 115 connects the driving mechanism mounting seat 13 and the waterproof sealing cover 11 as one body; the threaded hole 115 does not penetrate the waterproof sealing cover 11 to ensure the sealing performance of the waterproof sealing cover 11.

In the preferred embodiment, referring to FIG. 1, FIG. 2, FIG. 4 and FIG. 6, a spring mounting platform 116 is also arranged on the waterproof sealing cover 11, and a metal spring piece 20 is installed on the spring mounting platform 116, and a metal spring piece 20 is arranged on the metal spring piece 20. There is an assembly hole, and a fastener 21 is arranged on the cutter head assembly 2 to realize the detachable connection between the cutter head assembly 2 and the main body 1.

In this embodiment, referring to FIGS. 1 and 4, the aforementioned identification part 4, positioning pin 17 and fastener 21 are all arranged at intervals on a connection base 22. The connection base 22 is arranged on the cutter head assembly 2 facing the main body 1 An anti-interference through hole is provided on one side of the connection base 22 for the double tank transmission part 23 connected to the output shaft 31 of the drive assembly 3 to pass through. By arranging the identification part 4, the positioning pin 17 and the fastener 21 on the same connection base 22, the overall assembly and installation is facilitated.

In the preferred embodiment, referring to FIGS. 1 and 2, the driving mechanism mounting seat 13 is provided with a cylindrical sleeve 131, and the drive assembly 3 is installed on the driving mechanism mounting seat 13. The output shaft 31 of the drive assembly 3, the cylindrical sleeve 131 and the waterproof sealing cover 11 penetrate through the driving mechanism mounting seat 13 in sequence and then extend to the outside of the sealed cavity 50. The cylindrical sleeve 131 and the driving mechanism mounting seat 13 may be integrally formed, or they can be formed separately and then connected through fasteners. A double tank transmission part 23 is set on the free end 74 of the output shaft 31 of the drive assembly 3, and one of the grooves 76 of the double tank transmission part 23 is set on the free end 74 of the output shaft 31 of the drive assembly 3. On the top, another groove 78 is sleeved on the linkage 24 of the cutter head assembly 2, and the output shaft 31 of the drive assembly 3 rotates to drive the double tank transmission part 23 to rotate, so that the double tank transmission part 23 drives the linkage 24 to rotate to further drive the corresponding movable blade in the cutter head assembly 2 to run.

In the preferred embodiment, referring to FIG. 1, a stepped waterproof seal 25 is provided between the cylindrical sleeve 131 and the waterproof sealing cover 11. The waterproof seal 25 is pressed against the cylindrical sleeve 131 through the waterproof sealing cover 11, and is waterproof. The waterproof seal 25 is wrapped on the side wall 80 of the output shaft 31 of the drive assembly 3. Specifically, the outer wall of the cylindrical sleeve 131 is stepped, and one of the steps is opposite to the panel 111 of the waterproof sealing cover 11. The shape of the waterproof seal 25 matches the shape of the outer wall of the cylindrical sleeve 131. After the waterproof sealing cover 11 and the driving mechanism mounting seat 13 are assembled, the panel 111 of the waterproof sealing cover 11 presses the waterproof seal 25 against the step surface of the cylindrical sleeve 131, and the waterproof sealing cover 11 and the cylindrical sleeve are sealed by the waterproof sealing member 25. The assembly surface between the step surfaces of the cylindrical sleeve 131 effectively prevents external liquid from entering the inside of the sealed cavity.

In this application, unless otherwise expressly stated and limited, a first feature being "on" or "below" a second feature may mean that the first and second features are in direct contact, or the first and second features are in indirect contact through an intermediary. touch. Furthermore, the terms "above", "above" and "above" the first feature is above the second feature may mean that the first feature is directly above or diagonally above the second feature, or simply means that the first feature is higher in level than the second feature. "Below", "below" and "beneath" the first feature to the second feature may mean that the first feature is directly below or diagonally below the second feature, or simply means that the first feature has a smaller horizontal height than the second feature.

In the description of this specification, reference to the description of the terms "preferred embodiment", "yet another embodiment", "other embodiments" or "specific examples" means that the specific features, structures, structures, etc. described in connection with the embodiment or example. Materials or features are included in at least one embodiment or example of the present application. In this specification, the schematic expressions of the above terms are not necessarily directed to the same embodiment or example. Furthermore, the specific features, structures, materials or characteristics described may be combined in any suitable manner in any one or more embodiments or examples. Furthermore, those skilled in the art may combine and combine different embodiments or examples and features of different embodiments or examples described in this specification unless they are inconsistent with each other.

Although the embodiments of the present application have been shown and described above, it can be understood that the above-mentioned embodiments are illustrative and cannot be understood as limitations of the present application. Those of ordinary skill in the art can make modifications to the above-mentioned embodiments within the scope of the present application. The embodiments are subject to changes, modifications, substitutions and variations.

INDUSTRIAL APPLICABILITY

In general the foregoing disclosure finds utility in providing a hair cutter in which a main body is adapted for use with multiple different cutter head assemblies with different functions, and can automatically determine and provide the required running speed associated with expected performance each of the different cutter head assemblies.

What is claimed is:

1. A hair cutter, comprising:
- a cutter head assembly having a cutting type, the cutter head assembly configured to be removably coupled to a main body, the cutter head assembly including:
  - an identification part associated with the cutting type of the cutter head assembly; and
- a main body comprising:
  - a detection assembly configured to transmit a signal indicative of the cutting type of the cutter head assembly based on the identification part;
  - a drive assembly disposed inside the main body and including an output shaft configured to be detachable from the cutter head assembly; and
  - a control board disposed inside the main body and in communication with the drive assembly and the detection assembly, the control board configured to determine the cutting type of the cutter head assembly based on the signal received from the detection assembly and to drive the cutter head assembly based on the cutting type of the cutter head assembly:
- wherein the identification part comprises a light-transmitting plate receivable in an identification channel disposed in the main body when the cutter head assembly is coupled to the main body, wherein the light-transmitting plate is made of a first material having a first light transmittance, the first light transmittance is associated with a cutting type; and
- the detection assembly includes:
  - the identification channel disposed inside the main body and including a first sidewall and a second sidewall disposed opposite to the first sidewall, wherein the identification channel is made of a second material having a second light transmittance;
  - an infrared transmitter is disposed adjacent to the first sidewall of the identification channel, the infrared transmitter configured to emit a first infrared light through the first sidewall and the light-transmitting plate; and
  - a photoelectric receiver disposed adjacent to the second sidewall of the identification channel and configured to receive a second infrared light from the second sidewall, the second infrared light associated with transmission of the first infrared light through the first sidewall and the light-transmitting plate;
  - wherein the signal is based on the second infrared light,
  - wherein the control board is configured to control an output speed of the drive assembly based on the signal to drive the cutter head assembly.

2. The hair cutter according to claim 1, wherein the infrared transmitter and the photoelectric receiver are disposed 2 mm-8 mm apart; and/or the second light transmittance of the second material of the identification channel is above 85%.

3. The hair cutter according to claim 1, in which the main body further includes:

an outer shell;

a waterproof inner shell disposed inside the outer shell, the waterproof inner shell having a port at one end; and a waterproof sealing cover disposed over the port of the waterproof inner shell and adjacent to the identification channel, wherein the waterproof inner shell and the waterproof sealing cover cooperate to form a sealed cavity, the sealing cover including a top panel that includes cover through hole, wherein a channel opening of the identification channel is disposed in communication with the cover through hole and the identification channel is disposed to extend from the top panel of the waterproof sealing cover into the waterproof inner shell, wherein when the cutter head assembly is coupled to the main body, the light-transmitting plate of the cutter head assembly is releasably disposed in the identification channel through the channel opening in the top panel of the waterproof sealing cover.

4. The hair cutter according to claim 3 further comprising:

a driving mechanism mounting seat disposed in the sealed cavity, and in which the detection assembly further comprises a detection component PCB disposed on the driving mechanism mounting seat, wherein the infrared transmitter and the photoelectric receiver each are electrically connected to the detection component PCB through pins, and the detection component PCB is electrically connected to the control board.

5. The hair cutter according to claim 4, in which the infrared transmitter includes a first pin and the photoelectric receiver includes a second pin in which the driving mechanism mounting seat includes:

a recessed receiving chamber disposed in a side of the driving mechanism mounting seat proximal to the waterproof sealing cover, the detection component PCB set at a notch of the receiving groove, wherein the first pin of the infrared transmitter and second pin of the photoelectric receiver penetrate the detection component PCB and extend into the receiving chamber;

a partition is disposed in the receiving chamber and configured to separate the first pin of the infrared transmitter and the second pin of the photoelectric receiver in two different spaces.

6. The hair cutter according to claim 4, in which the driving mechanism mounting seat further includes a cylindrical sleeve, and the drive assembly is installed on the driving mechanism mounting seat, wherein when the drive assembly is installed on the driving mechanism mounting seat, the output shaft of the drive assembly sequentially penetrates the cylindrical sleeve and the waterproof sealing cover on the driving mechanism mounting seat and then extends to the outside of the sealing cavity;

wherein the free end of the output shaft of the drive assembly is provided with a double tank transmission part, and one of the grooves of the double tank transmission part is set on the drive assembly, wherein, on the free end of the output shaft, another groove is sleeved on the linkage of the cutter head assembly.

7. The hair cutter according to claim 6, wherein a stepped waterproof seal is disposed between the cylindrical sleeve and the waterproof sealing cover, and is wrapped around the side wall of the output shaft of the drive assembly.

8. The hair cutter according to claim 3, in which the waterproof sealing cover further comprises a positioning slot oriented to face the cutter head assembly, and the cutter head assembly further comprise a positioning pin configured to be received in the positioning slot when the cutter head assembly is coupled to the main body, wherein when the positioning pin is received in the positioning slot, the positioning pin penetrates the outer shell; and/or in which the waterproof sealing cover further comprises a positioning post, and the outer shell further comprises a positioning hole, wherein when the waterproof sealing cover is disposed on the waterproof inner shell, the positioning post is disposed in the positioning hole; and/or in which the waterproof sealing cover further comprises a threaded hole disposed oriented to face the sealed cavity, and in which the driving mechanism mounting seat further comprises a countersunk hole disposed opposite to the threaded hole, wherein a threaded fastener is extends through the countersunk hole and is threadingly secured into the corresponding threaded hole to connect the driving mechanism mounting seat and the waterproof sealing cover.

9. The hair cutter according to claim 3, in which an annular side wall of the waterproof sealing cover includes an annular protrusion disposed between the annular side wall and the inner shell;

wherein:

the waterproof sealing cover further includes: an annular groove disposed on the annular side wall between the annular protrusion and the cover opening, and an annular sealing ring disposed in the annular groove, wherein when the annular sidewall of the waterproof sealing cover is disposed in the port of the waterproof inner shell, the annular sealing ring is pressed against the side inner wall of the waterproof inner shell, and the annular protrusion is oriented parallel to and in contact with the plane of the port of the waterproof inner shell; and/or the waterproof sealing cover further comprises a spring mounting platform, a spring piece coupled to the spring mounting platform, and an assembly hole disposed in the spring piece; and/or the cutter head assembly further comprises a fastener configured to snap into the metal spring piece.

* * * * *